United States Patent
Martinez

(10) Patent No.: US 7,809,169 B2
(45) Date of Patent: Oct. 5, 2010

(54) SECURE POINT OF SALES BIOMETRIC IDENTIFICATION PROCESS AND FINANCIAL SYSTEM FOR STANDALONE AND REMOVE DEVICE TRANSACTIONS (PAYSECURE)

(76) Inventor: Pamela J. Martinez, 12308 Putters Ct., Upper Marlboro, MD (US) 20772

( * ) Notice: Subject to any disclaimer, the term of this patent is extended or adjusted under 35 U.S.C. 154(b) by 1066 days.

(21) Appl. No.: 11/365,863

(22) Filed: Mar. 2, 2006

(65) Prior Publication Data
US 2007/0005511 A1   Jan. 4, 2007

Related U.S. Application Data

(60) Provisional application No. 60/657,387, filed on Mar. 2, 2005.

(51) Int. Cl.
G06K 9/00 (2006.01)

(52) U.S. Cl. .......................... 382/115; 235/379; 705/57; 705/65; 713/159; 713/172

(58) Field of Classification Search ................. 382/100, 382/115, 124, 125; 705/57, 64, 65, 67; 235/379, 235/380; 713/159, 172
See application file for complete search history.

(56) References Cited

U.S. PATENT DOCUMENTS

| | | | | |
|---|---|---|---|---|
| 6,105,006 | A * | 8/2000 | Davis et al. | 705/35 |
| 7,570,781 | B2 * | 8/2009 | Rhoads et al. | 382/100 |
| 2002/0044662 | A1 * | 4/2002 | Sowler | 380/277 |
| 2002/0129257 | A1 * | 9/2002 | Parmelee et al. | 713/180 |
| 2004/0201739 | A1 * | 10/2004 | Kuwayama | 348/231.3 |
| 2005/0105734 | A1 * | 5/2005 | Buer et al. | 380/270 |
| 2005/0125360 | A1 * | 6/2005 | Tidwell et al. | 705/65 |
| 2005/0169496 | A1 * | 8/2005 | Perry | 382/100 |
| 2006/0016879 | A1 * | 1/2006 | Kean | 235/380 |
| 2007/0005511 | A1 * | 1/2007 | Martinez | 705/67 |

* cited by examiner

*Primary Examiner*—Gregory M Desire
(74) *Attorney, Agent, or Firm*—Connolly Bove Lodge & Hutz LLP

(57) ABSTRACT

The present invention is an apparatus, method and system for secure point-of-sale (POS) and biometric data/finger print identification communications technology and systems processing methods in the area of financial merchant transactions. The present invention may use either or both standalone biometrics and biometric/fingerprinting technology with a touch screen device or a portable/mobile wireless device to securely process merchant POS financial transactions.

15 Claims, 16 Drawing Sheets

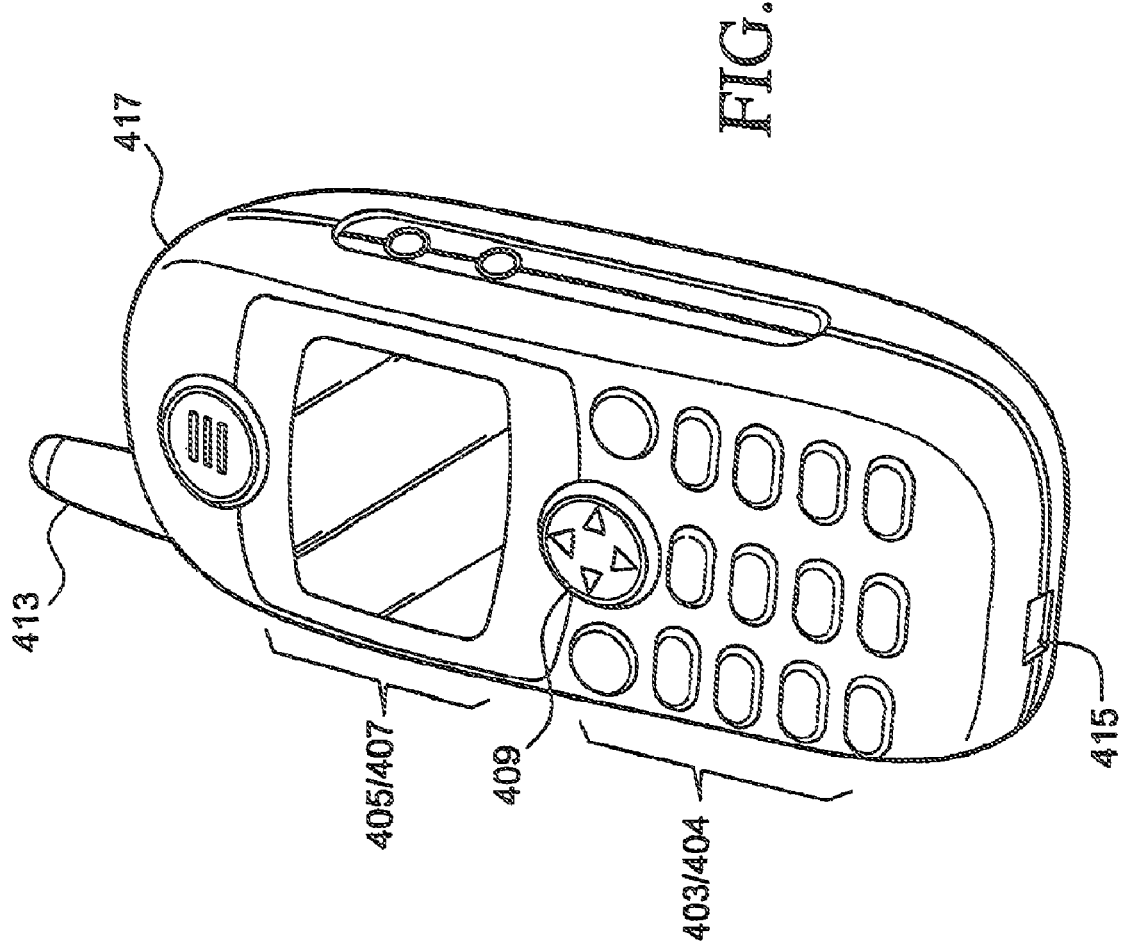

Network can exist on Cellular Networks Verizon, AT&T, Sprint, T-Mobile Cingular Or Financial Backbone I.e Visa, NYCE, Cirrus

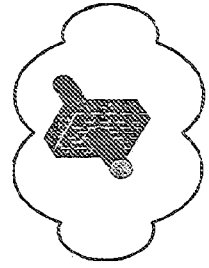

*HHD-PaySecure-to- SFIFI-to-SMIFS-Financial*

*Secure Communications Environment*
Java Crypto Environment (JCE)
Security and Trust Services API for J2ME™
SHA2 or Other Secure hashing Algorithm
Or Enhanced Security Environment from HHD

*Crypto- Environment – Use of various hashing, crypto algorithms*
Profiles to encrypt Finger Prints, Financial Data and Customer_ID
All transmissions are encrypted using 256 – 2048 byte
Creates encryption keys for all images stored using the highest level of encryption supported in Java for transmissions
Performance is not degraded negligibly
Private Network Secure Session (peer to peer) is established with HHD and TBN
Requires HHD_ID, Customer_ID and Image_ID (TripleID) to complete transaction

*SFIFI servers Database for HHD_IDs*
Simple Storage Environment
Storing Database i.e. Oracle
Obfuscation processes
Stores Encrypted HHD_ID's

FIG. 9B

SECURE POINT OF SALES BIOMETRIC IDENTIFICATION PROCESS AND FINANCIAL SYSTEM FOR STANDALONE AND REMOVE DEVICE TRANSACTIONS (PAYSECURE)

BACKGROUND OF THE INVENTION

This present invention uses secure biometric identification process and financial system device. This device takes advantage of the latest portable communications technology along with existing financial system processing methods in the area of personal banking. More specifically, the present invention uses at least one of biometrics and finger printing technology on a touch screen device in combination with an optional pass code to securely process financial or other secure information. Similarly, the apparatus, system and method of the present invention can be used in any other financial or secure transactions.

The use of physical attributes—fingerprints, a voiceprint, or any of several other personal characteristics—to verify identity has great potential. Passwords and personal-identification numbers (PIN's) are fraught with problems. Biometrics offers solutions to these problems. Applications that are preparing to accept biometric data include computer networks, ATMs, cars, cellular phones, and dozens of other types of embedded systems.

Widespread acceptance of biometrics means use in areas that daily affect the lives of millions of people. By replacing PIN's, biometric techniques prevent the unauthorized access to or fraudulent use of ATM's, cellular phones, smart cards, desktop PC's, workstations, and computer networks. For financial transactions, biometrics can replace PIN's and passwords. In buildings and work areas, biometric techniques replace keys, badges, and readers. By replacing PIN's for transfers of funds, biometrics enhances the security of credit/debit-card (plastic-money) systems. Biometric techniques also provide security not previously envisioned for "cash" balances stored in such cards. In particular, for point-of-sale (POS) terminals, biometric techniques can replace a clerk's verification of a customer's signature. Therefore, there is a need in the art to apply biometric techniques to make POS and other financial transactions more secure and convenient.

BRIEF SUMMARY OF THE INVENTION

The present invention is a secure biometric identification apparatus, method and system for financial processing. The apparatus, method and system of the present invention uses a Secure Finger Identification and Financial Information System (SFIFI) and Secure Multipurpose Identification Financial Warehouse and Storage System technology (SMIFS) for secure network access, identification, verification and processing, together with advanced security algorithms creates a new and complete system of methods known as iBank, which stands for identification banking. The apparatus, method and system are called PaySecure, a comprehensive term to identify using the iBanking network and an embedded application component. Using the iBanking network, a PaySecure system provides a way for consumers to exchange currency and transfer funds from personal accounts to a merchant's financial processing systems.

The apparatus, method and system of the present invention utilizes a secure identification processes to conduct financial transactions. The present invention has two modes of operation: (1) using a dedicated fingerprint reading PaySecure apparatus designed to interface with a merchant's financial processing systems; and (2) communicating, via a portable or wireless device, with a merchant's standalone POS device for financial transactions. The PaySecure system is designed to use portable handheld devices that utilize the embedded technology of the TinyBank network and wireless, cellular/digital, biometric and/or infrared mobile communication.

The TinyBank customer setup method and system is designed as a desktop (Client) for accessing a financial institution or other secure environment. The method at least comprises signing up customers for TinyBank Services; providing a list of servers and compatible list of Java Technology Wireless Industry (JTWI) compliant Handheld devices (HHD) by a Customer Representative (CR); opening a desktop application into the TinyBank Network (TBN) via a Secure Web Interface; completing a TinyBank Customer Application with a Banks Customer_ID; and using an Online Finger Print Device to accept Images sent to a TinyBank Online device (e.g., a server). The TinyBank technology is further defined in the co-pending U.S. Application entitled: "A Secure Identification Apparatus, System and Method in a Portable Electronic Device for Financial and Other Secure Systems" (U.S. application Ser. No. 11/341,457, which is based on U.S. Provisional Application No. 60/647,423), which is incorporated herein by reference.

The PaySecure apparatus, method and system of the present invention provides consumers with the capability to securely perform financial transactions, as well as communicate with financial institutions. This capability will allow financial institutions and network providers to identify customers and apparatus in a highly secure method. Today, many consumers are challenged with successfully managing credit cards and other banking services during a merchant point-of-sale (POS) transaction. In the present invention, a combination of devices, computer programs and communication networks are layered and designed in such a way with the latest encryption technology to provide the consumer a secure method for such POS transactions.

The apparatus of the present invention utilizes a keypad, display/input window or communication ports to enter local personal pass code information in order to access financial systems. The apparatus also accepts biometric/fingerprint data inputs. The apparatus may utilize encryption technology to protect account information, pass codes and biometric/finger print information. The apparatus of the Pay Secure Point-of-Sales (POS) apparatus sends financial transaction data along with on customer identification. The Pay Secure apparatus is capable of handing multiple transactions using debit and credit cards of personal and business customer accounts.

The Pay Secure apparatus is a standalone device with network capability connected to the merchant's financial and accounting systems. The PaySecure apparatus provides network capability to the banking network of propriety servers (e.g., SFIFI, SMIFS) to validate the customer identification. In addition, the PaySecure apparatus accesses most common financial networks Visa, MasterCard, American Express, Discover, Most, Plus, NYCE systems, etc.

The PaySecure apparatus may include chips and/or onboard programs designed for each network and activated by a bank of financial institution, as with credit cards type systems. The PaySecure apparatus may use a display/input window of a portable device to capture the biometric/fingerprint data and forward the data to a secure service for verification. The PaySecure POS apparatus may include a one-time pass code access technique to verify the apparatus on network and open an embedded application for conducting secure business/financial transactions.

The PaySecure apparatus is capable of passing secure information through a series of electronic communication devices anywhere, anytime, providing that a communication network is available. In particular, the PaySecure apparatus uses existing cellular/Wireless and/or Digital communications to send and receive data, such as receipts, the amount debited or credit if necessary. Further, the PaySecure apparatus uses the iBank methods as utilized on TinyBank Network. These consist of a network of applications, databases and crypto and security technology and existing financial communications networks. Alternatively, the PaySecure apparatus may use a new and separate communication network, allowing two-way communications between the apparatus of the present invention and financial key-access repositories may be used to support the TinyBank system. Examples of such networks include, but are not limited to: Internet Access or other Digital Communications Access. The PaySecure device can support existing smartcard or credit card technology, to support incremental deployments of the apparatus. These current card users and customers can continue to use the same device as new PaySecure and TinyBank customers.

The PaySecure apparatus provides two-way communications between user and financial institutions, transmits keys, and a CAPLET of the finger print and encrypted account information for complete identification and verification of a customer/user. A CAPLET is a combination thumb/fingerprint image and account information is created after network validation. The PaySecure apparatus may use both a standalone merchant device and a portable, handheld device, which will provide secure access technology and provides a convenient way to access all financial data. The PaySecure apparatus is capable of using alternate means of payment (e.g., credit and debit cards).

The PaySecure apparatus may also use portable or hand held devices (e.g., Personal Computers, handheld Personal Digital Assistants, Voice over Internet/Protocols Cellular, Digital, and Wireless phones with Embedded applications, NANO technology and programs, to communicate.

The present invention is a method and system for securely authenticating a client's identity using biometrics, such as finger print images, palm prints, and retinal scans; along with pass codes. In addition, the method of the present invention captures a finger print image on a display/input window and combines this with the pass code to create a method and system for secure access of financial networks.

The PaySecure method and system uses intelligent system matching so that different information may be accessed for different fingerprints. The PaySecure method and system may include bank servers that can be located on a closed network at financial institutions or at secure provider network. The PaySecure method and system maintains biometric data/fingerprints in a secure highly encrypted relational or object oriented database. The PaySecure method and system preferably includes a security infrastructure that is flexible and comprising: PINs and Keys for network access; Pin and Keys for iBank access with all networks; and using a one time, pass code technology that provides a method for handheld or Smart devices to interface and authenticate using a two-factor authentication method. This can be implemented as a communications access method between application servers to the financial institutions. More specifically, in an alternative hosting mode, where as the iBanking processes are not co-located within the financial institutions. Specific Financial Cryptography can support and enhances this feature.

The PaySecure method and system uses the TinyBank system/network which consists of 4 basic parts: (1) a physical device, such as a card reader, finger print interface, and communication ports that are used for input and output from and to the financial institution; (2) Cellular or Wireless communications security and protocols used to connect to financial institution; (3) a first repository with one time pass-code to permit communications; and (4) a second repository (e.g., databases, data warehouses, clearinghouses) containing biometric/fingerprint data and encrypted account information.

One embodiment of the invention is a method for secure point-of-sales transactions, comprising: sending an open secure transactions message; displaying menu options, wherein the menu options include at least one of selecting "card choice" option and selecting at least one of "debit," "credit" or "check card;" determining whether or not the customer selects the "card choice" option; waiting for another secure transaction message when "card choice option" is not selected. In addition, this embodiment comprises: displaying an "Input biometric/fingerprint data" message if "card choice was selected; accepting biometric/fingerprint image data; creating a hash of the biometric/fingerprint image data and encrypting the biometric/fingerprint image data; determining whether or not the encrypting step was successful; and repeating the determining step at least three times if unsuccessful; displaying "No Valid Input."

Further, this embodiment comprises: when unsuccessful three times; opening secure communications with bank servers when successful; sending a one-time pass code to the bank servers; determining whether or not the pass code is valid; displaying an "Invalid Device" message when the pass code is invalid; sending an encrypted Hash image from the POS when the pass code is valid; determining whether or not the customer identification is valid with the bank servers; and displaying a "Invalid Customer" message when invalid. Furthermore, this embodiment comprises: opening a secure communication connection with at least one of a bank, financial institution and a secure facility when valid; creating and encrypting a CAPLET at the SFIFI servers; sending the encrypted CAPLET to the SMIFS servers; decrypting the CAPLET at the SMIFS; determining whether or not the decrypted CAPLET is valid; creating a record stamp when the CAPLET is invalid; and decrypting stored account information when CAPLET is valid. Moreover, this embodiment comprises: performing a matching process on CAPLET data; determining whether matching process is successful; sending "Transaction Failed" message when unsuccessful; and sending matched status and transaction request to bank, financial institution or secure facility when successful.

The apparatus, method and system of the present invention provides an improved approach for accessing financial networks for the purpose of conducting merchant transactions from checking, savings and/or credit card accounts. However, the PaySecure apparatus, method and system capabilities are not limited to secure identification for financial purchases and funds transfer. These techniques are also applicable to a wide range of applications requiring secure communications and user identification.

BRIEF DESCRIPTION OF DRAWINGS

FIG. 2 shows an exemplary input apparatus or device (e.g., a generic cell phone) that may be integrated into the PaySecure method and system of the present invention.

FIG. 9A and FIG. 9B are exemplary charts outlining functions of the system architecture.

DETAILED DESCRIPTION OF THE INVENTION

The present invention is a secure point-of-sale (POS) and biometric data/finger print identification communications technology and systems processing methods in the area of financial merchant transactions. The present invention may use either or both standalone biometrics and biometric/fingerprinting technology with a touch screen device or a portable/mobile wireless device to securely process merchant POS financial transactions.

In particular, the present invention utilizes biometric technology to specifically and securely identify customers/users. The method of the present invention comprises: using biometric data (e.g., thumbprint, fingerprint, retinal scans, etc.) and pass-codes (e.g., personal identification numbers, passwords, etc.) to obtain secure access to a financial network; transmitting the biometric data and pass codes to a clearinghouse for matching customer identification (ID)/key and granting network access; and allowing financial transactions and transmitting financial data for customers granted access.

In the method and system of the present invention, each financial organization (e.g., Visa, MasterCard, American Express) will maintain biometric data and pass codes in a highly secure encrypted database. Additional data warehouses are maintained on the Credit Card Backbone and other financial networks. Embedded application programs intelligently identify secure, portable remote devices (e.g., cell phones and PDAs). The financial information may be accessed at POS terminals and via the TinyBank system. The apparatus, method and system of the present invention will include the intelligence to obtain different access privileges for different biometric/fingerprint data. In addition, the apparatus of the present invention will utilize Hotkeys to shorten operation commands and input sequences.

Figure 1:
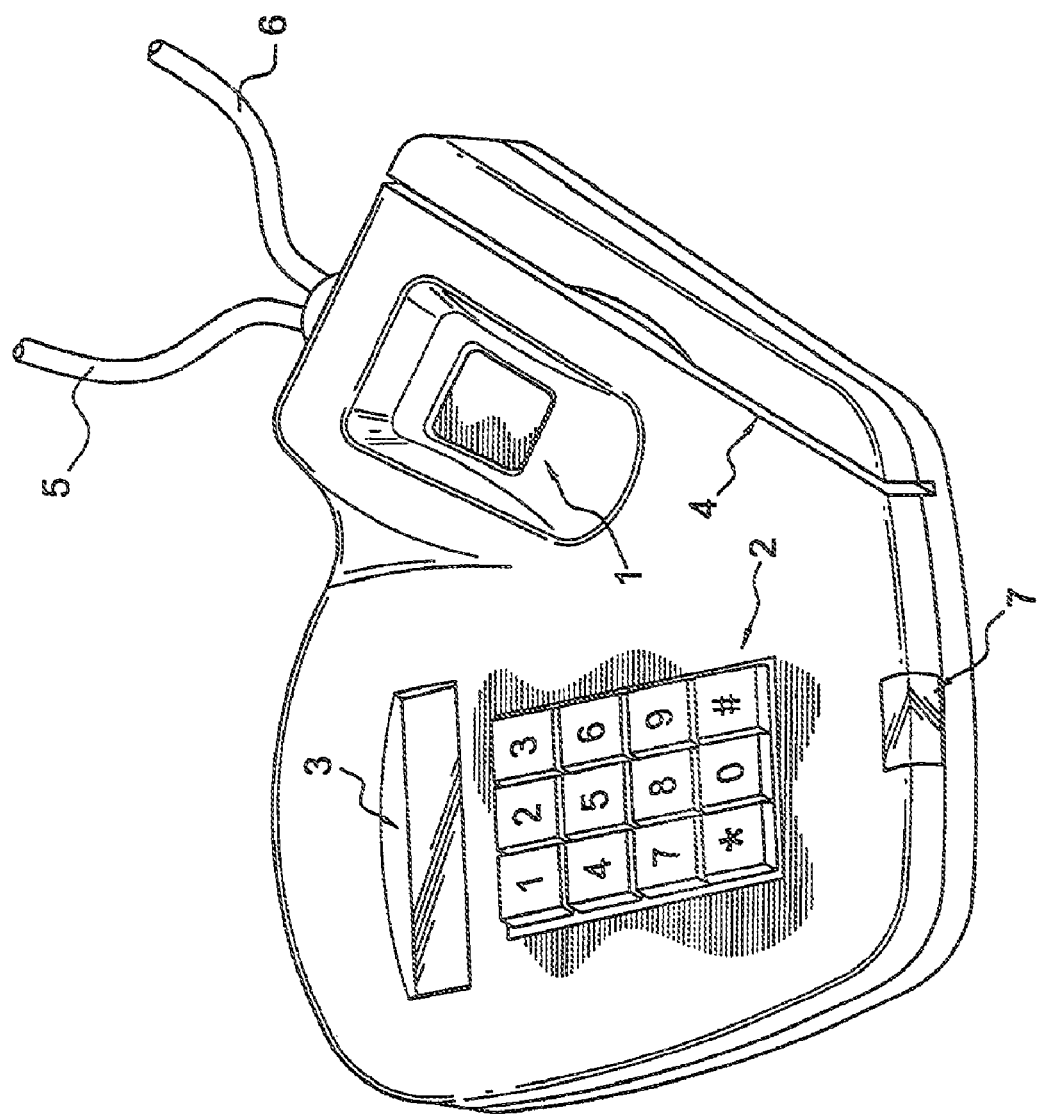
FIG. 1 illustrates an exemplary embodiment of the apparatus of the present invention.

FIG. 1 illustrates an exemplary embodiment of the apparatus of the present invention that allows the customer to transmit biometric data and pass code information and receive/monitor the results of financial transactions. In this embodiment, the apparatus comprises a biometric data/fingerprint reader 1 with an alphanumeric keypad 2 and a display/input window 3. In addition, this embodiment further comprises: a card reader input port 4 for reading electronic data from a credit card or other media; a first communication port 5 that may be connected to a merchant's POS terminal; a second communication port 6 that may be connected to an iBank or other financial institution; and an infrared communication port 7 for remote (i.e., not physically connected) access to the PaySecure apparatus.

Preferably, interfaces that may be used for the various communication ports 4, 5, 6, 7 of this embodiment include, but are not limited to: USB, RS-232, IEEE-1394, Bluetooth and other well known device interface standards. Example devices that may be interfaced to this embodiment include, but are not limited to: power sources, other TinyBank apparatus, power, radio telephones (i.e., cellular and wireless), personal digital assistants, personal computers and other well known personal communication devices.

Preferably, this embodiment of the apparatus is 6-8 inches in length and 6-8½ inches in width. Preferably, the display/input window 3 supports menu and touch screen inputs; and the keypad 2 supports manual alphanumeric inputs that may be used to enter data and direct the operation of the present invention.

FIG. 2 shows an exemplary input apparatus or device (e.g., a generic cell phone) that may be integrated into the PaySecure method and system of the present invention. In particular, the PaySecure method/software can be integrated into a generic cell phone 417 as shown in FIG. 2, a PDA, or other portable programmable device and provide the same functionality as the apparatus of FIG. 1. Specifically, as shown in FIG. 2, the generic cell phone 417 may provide an alphanumeric keypad 403/404; display/input window 405/407; cursor control 409; a first communication port 413; and a second communication port 415, analogous to those provided by the embodiment shown in FIG. 1. In addition, the generic cell phone 417 further comprises a display/input window 405 modified for fingerprint recognition and also includes an embedded application software for secure network access and identification.

Alternatively, the PaySecure apparatus and method of the present invention can also be implemented on a portable computer (PC), personal digital assistant (PDA), embedded smart technology using Nano technology, or other well known portable devices comprising an alphanumeric keypad/keyboard, display/input window and cursor control. In addition, fingerprint or biometric data capabilities can be provided by an external device interfaced to the apparatus through one of the plurality of communication ports discussed above.

In the merchant industry the PaySecure method and system of the present invention should exist on a closed and/or secure telecommunication network. Examples of such networks include, but are not limited to: dial-up and point-to-point communications between the merchant and the financial institution. The PaySecure system combines the use of financial transaction processing along with biometric systems, such as but not limited to: the Secure Finger Identification Financial Information System (SFIFI) and the Secure Multipurpose Identification Financial Warehouse and Storage System technology (SMIFS) for secure network access, identification, verification and processing.

The SFIFI system includes, but is not limited to: a Java services and components based computer application that runs on a UNIX based or other system capable of multitasking and multiprocessing. SFIFI is designed as both a secure application for encrypting (Hashing) and matching as well as network services application. However, the technology maybe coded and compiled to support other languages such as C++, C# and or other high-level object oriented programming language. The SFIFI application is designed to facilitate a communications process and control the access of any device to any proprietary financial institution's network.

The SFIFI system combines the use of financial transactions process and biometric/fingerprinting technology for verification and access. The SFIFI processes the transactions from input screens, biometric data/fingerprint readers embedded with the iBanking and PaySecure programs and application to the SMIFS.

The SFIFI system is a combined series of computer applications that runs on a UNIX based system, using the highest encryption capability available designed as a service and communications network application. The SFIFI application is designed to facilitate communication process and control the network access of devices using the PaySecure and TinyBank systems.

In addition, the method and system of the present invention at least comprises a TinyBank Application Installation and Registration for the apparatus or portable handheld device (HHD) of the present invention. That is, the method and system of the present invention at least includes the TinyBank Online application REGISTERS, ENCRYPTS and STORES image and Customer_ID and Creates TinyBank_ID to a Secure Multipurpose Information Financial Systems (SMIFS) database; verifying SMIFS backend setup; matching biometric images (e.g., digital equivalent) or smartcard data; verifying Customer_ID with Unique TinyBank data and banks records; identifying the relation between TinyBank_ID record to Bank accounts; and providing a predetermined access level to TinyBank.

Further, the present invention includes, but is not limited to: connecting a customer to the TinyBank Network (TBN); entering/inputting the Unique Code/Pass Code of the customer; confirming a phone number for validation; registering the apparatus of handheld device identification number (HHD_ID); flashing/sending the TinyBank Code to the HHD; loading the Encryption Code; reading the HHD identification number; encrypting and storing in a mini-table on the apparatus, handheld device or system; and testing, storing and validating finger print data in an Authentication and Network Session.

Furthermore, the method and system of the present invention at least comprises a SFIFI server that authenticates a first phase HHD_ID with SFIFI Local Database during a first phase of network access. The present invention includes, but is not limited to: generating The HHD_ID at the Financial Institution during Account_Creation or during application activation using /Service Activation Process; and sending biometrics data or embedded smartcard data from the HHD to the SFIFI and server.

Moreover, the PaySecure apparatus, method and system of the present invention are designed to provide a secure, confidential customer to merchant transaction of any type. Thus, this technology is not limited to the POS merchant industry. PaySecure is also useful in other venues and for other purposes of secure identification on any consumer transaction. Examples include, but are not limited to: hospitals, employee validations, and other environments which require secure identification of a user.

Figure 3A:
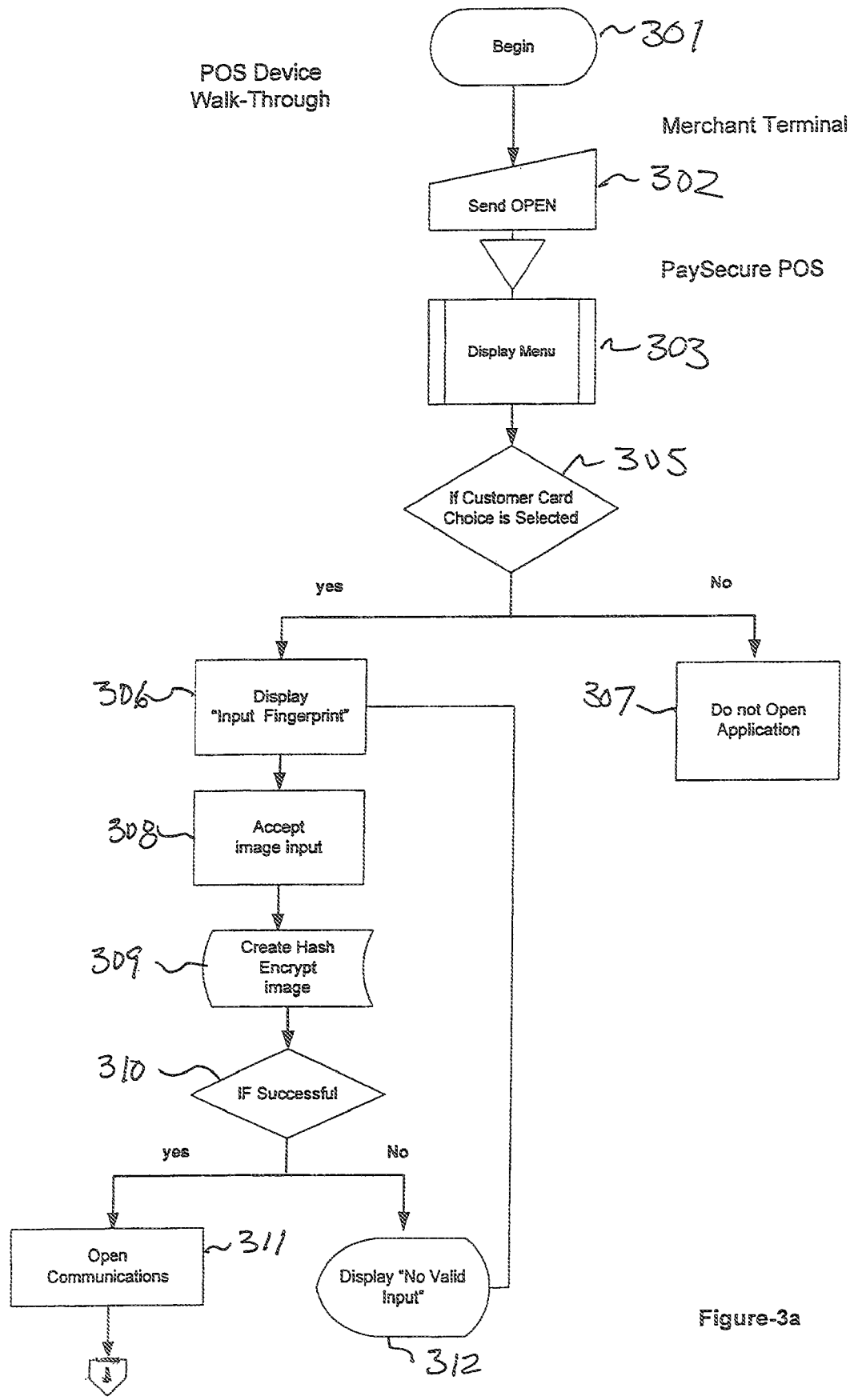
FIG. 3A is an example flow diagram of part A of the minimum steps required for a basic PaySecure method of the present invention.

FIG. 3A is an example flow diagram of part A of the minimum steps required for a basic PaySecure method. In step 301 of FIG. 3A, the method begins with a Manual Start. A user sends an "Open" application Command from a Merchant Terminal to a PaySecure POS apparatus in step 302. In addition, the user selects the TinyBank Network or other BFPS and Local or Remote Device. When TinyBank Network is selected, the PaySecure POS apparatus connects the Merchant Terminal to an iBank Frontend. In step 303, the iBank sends a "Display Menu Options" Command to the PaySecure POS apparatus. The Display Menu: opens on the PaySecure apparatus; displays the "Select Card" option; and displays "Debt, Credit or Check Card" menu options in step 304. When a Local Device/Customer Card Choice is selected in step 305, the method proceeds to step 306. Alternatively, the user/customer may select to call other Mobile Financial Personal System (MBFPS) by selecting NO at step 305 and the routine ends without opening the embedded application.

In step 306, an "Input Fingerprint/Biometric" command is displayed on the PaySecure apparatus. Step 308 accepts the input finger print/biometric image and step 309 creates a hash image and encrypts the hash image. Step 310 determines whether the steps 306-309 were successful. If these steps were successful, communication from the PaySecure apparatus to the iBank Servers is opened in step 311. Alternatively, if these steps were not successful, "No Valid Input" is displayed on the PaySecure apparatus in step 312. After waiting 30 seconds, steps 306-310 are repeated at least three times in an attempt to open communications.

Figure 3B:
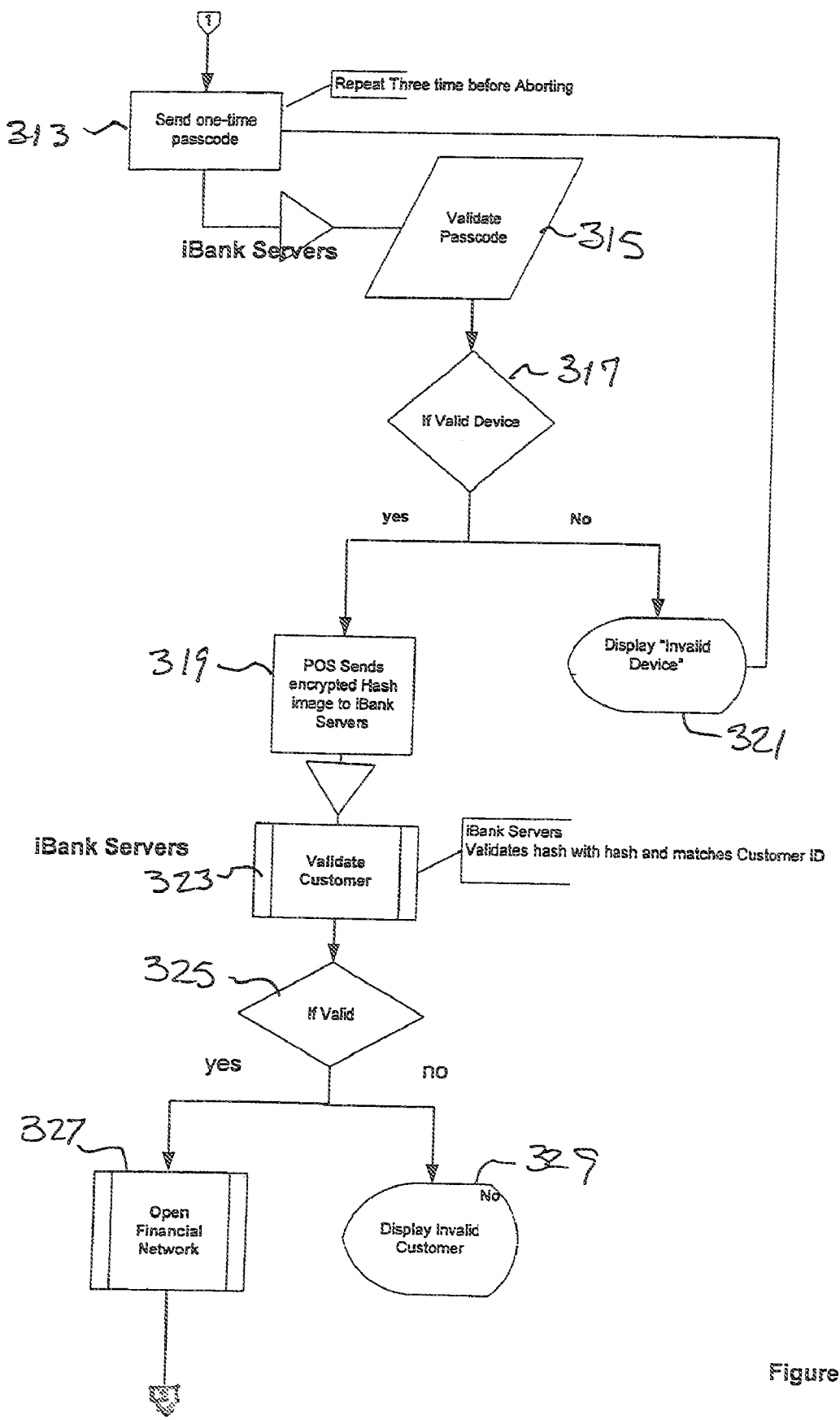
FIG. 3B is an exemplary flow diagram of part B of PaySecure method of the present invention.

FIG. 3B is an exemplary flow diagram of part B of PaySecure method. Sending a one time pass code for the user/apparatus to iBank network access servers occurs in Step 313. Step 313 is repeated at least three times before aborting. In step 315, an attempt is made to validate the pass code. If the pass code is invalid, a "Device Invalid" display message is sent to the Paysecure apparatus in step 321. If the pass code is valid, the PaySecure apparatus sends a Hash Encrypted image to the iBank Server(s) in step 319. The servers for iBank attempt to validate the customer/user information in step 323, by matching the PaySecure POS image and Customer_ID to the iBank Image and Customer_ID information for the customer/user. If validation attempt of step 325 is successful, iBank sends an "Open Network" command to the financial institution's SFIFI servers and a connection to the financial network is established in step 327. Alternatively, if validation step 325 is unsuccessful, an "Invalid Customer" message is displayed on the Paysecure apparatus.

Figure 3C:
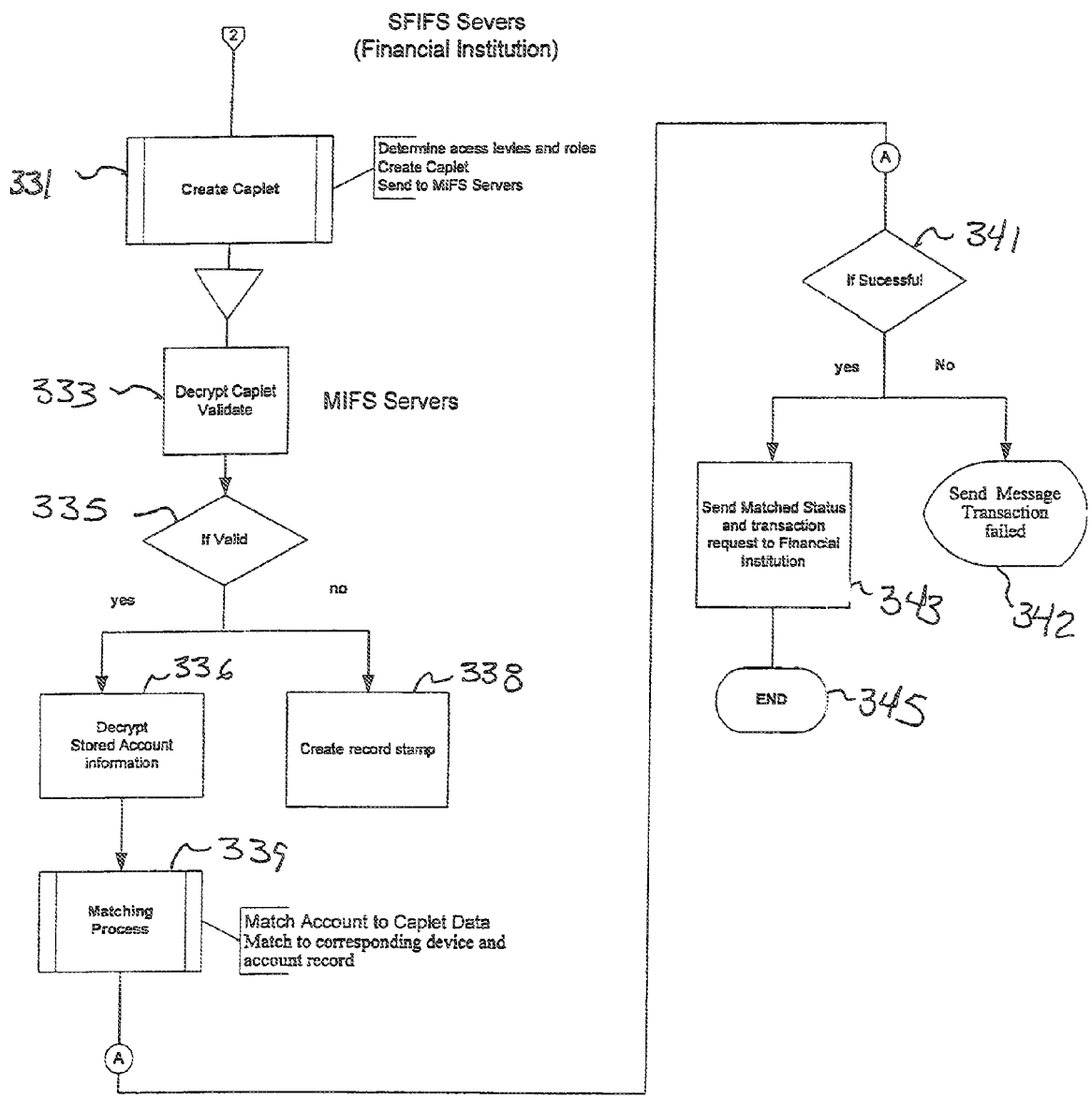
FIG. 3C is an exemplary embodiment of part C of PaySecure method of the present invention.

FIG. 3C is an exemplary embodiment of part C of PaySecure method. In this part of the method, the Encrypted Hash and Customer ID are sent to the SFIFI Server. The SFIFI server decrypts the image and Customer ID and attempts to verify the decrypted Hash and customer ID information. If the information is verified in step 331, the SFIFI server looks up additional stored customer information and determines the customer/user access levels and roles and then sends this information to the MIFS servers. If not verified, an "Invalid Customer" message is displayed on the apparatus and a "Close Network" command is issued. Next, the SFIFI requests a customer pass code. If the pass code is invalid, a "Password Invalid" code is sent to the PaySecure apparatus and another request for a customer pass code is attempted. IF the pass code is valid, a CAPLET and wrapper (i.e., an encrypted image, customer_ID and/or Account No.) is also created in step 331.

In step 333 the CAPLET is sent to a repository (i.e., SMIFS) server. The repository server unwraps (i.e., decrypts) and attempts to validate the CAPLET data (i.e., the image and customer_ID). If the CAPLET is valid in step 335, the SMIFS server creates a record stamp with the encrypted fingerprint image; and decrypts stored account and other stored information in step 336. However, if the CAPLET is invalid in step 335, a record stamp is created and the routine ends.

In step 339, a matching process begins wherein a match account to CAPLET data and matches the corresponding device/customer/user and account record. If the matching process is successful in step 341, a match status and transaction request is sent to the financial institution in step 343. If the matching process is determined as unsuccessful in step 341, a "Transaction Failed" message is sent to the Paysecure apparatus and the routine ends.

Figure 4:
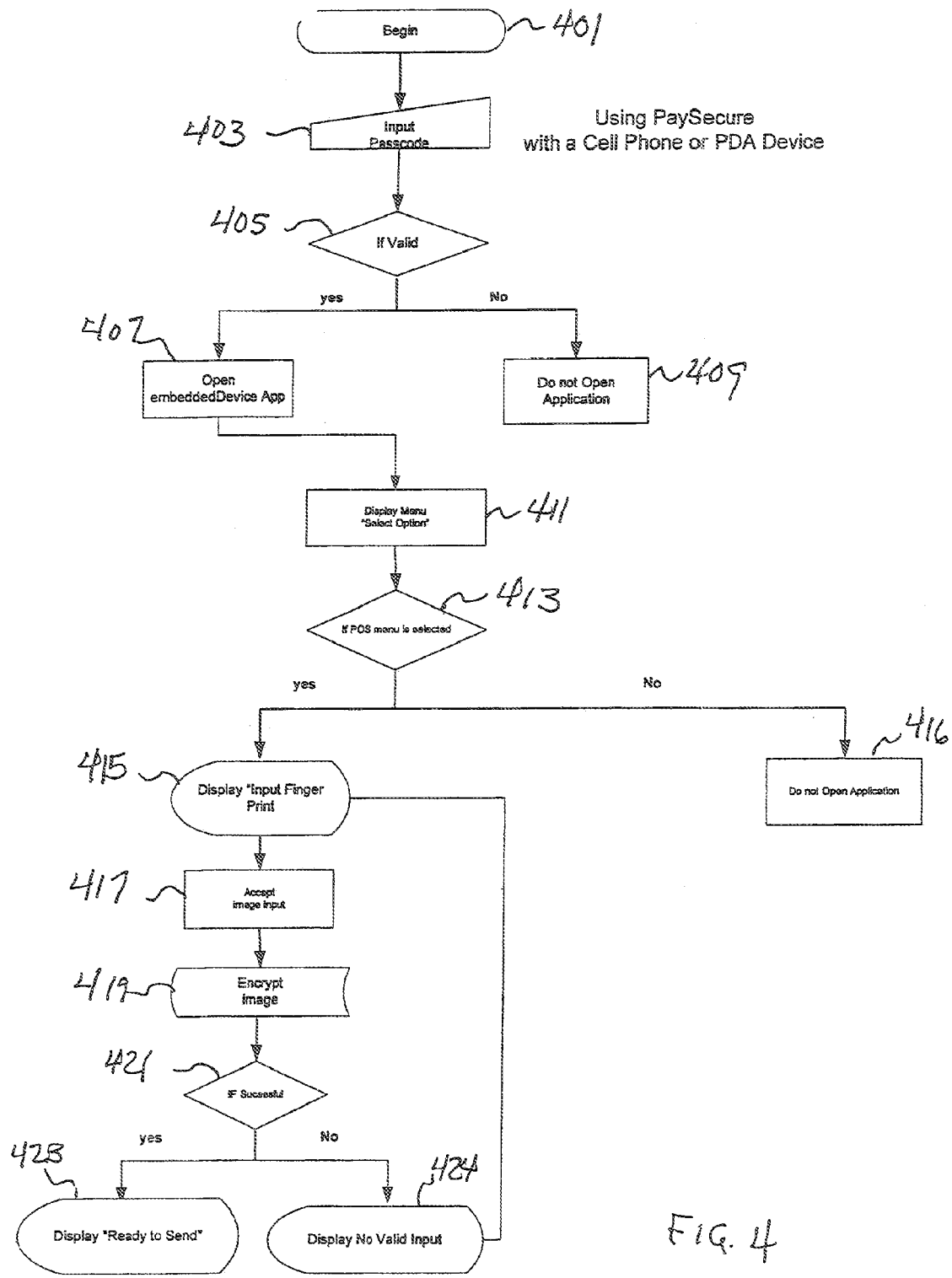
FIG. 4 is an exemplary flow diagram for the frontend of the PaySecure method using a PDA/Wireless technology.

FIG. 4 is an exemplary flow diagram for the frontend of the PaySecure method using a PDA/Wireless technology. In step 403, the user/customer begins the process by manually inputting a pass code into a cell phone or PDA for local verification. Verification of the pass code is performed next. If the pass code is determined to be invalid in step 405, the application in not opened and the routine ends in step 409. If the pass code is determined to be valid in step 405, an "Open Device" command is sent to an embedded application in step 407.

In step 411, a display menu "Select Option" is shown on the display of the PaySecure apparatus. The "Select Option" includes at least one of "TinyBank" or "PaySecure." If the pass code in step 405 is determined to be invalid, the manual input of the pass code is repeated in step 403. If menu option "PaySecure" is selected in step 411, display "Input biometric data/fingerprint" in step 415.

The TinyBank application in a portable/handheld/mobile device is an application standalone with multiple functions. One is to access financial institutions from the Cellular network without the use of PaySecure. Once the TinyBank application is selected, a menu allows the user to make a selection from a list of functions when available. TinyBank in concert with the PaySecure device will cause the application perform in a different mode of operation. For example, one mode of operation is the "HandHeld-to PaySecure Device" mode. This is performed in concert with the TinyBank application when the merchant "readies" the PaySecure device (from the Merchants terminal) and selects to "Pay using mobile device", when using this method the customer can activate application via on the handheld device by simply pointing the device at the PaySecure device. This establishes secure smart communications between the two devices. The handheld device will be prompted to call internal code that will request the "Enter Thumbprint" routine on the handheld.

The method of the present invention allows the customer to interact with PaySecure from the handheld or mobile device. The merchant may select "Pay using Thumbprint on the PaySecure apparatus", "Pay using Smartcard" or "Pay using Credit or Debit cards". Thus, if the TinyBank application is selected this will in effect will start the "TinyBank to SFIFI server" and/or financial institution standalone mode of operations. The merchant has to perform a function to ready the PaySecure apparatus prior to and the handheld can operate in concert using other customer convenient options i.e. smart data or the customer can interact in a more customer input driven manner.

The biometric data/fingerprint image is accepted in step 417 and encrypted in step 419. If the acceptance and encrypting steps are determined to be successful in step 421, an "Open Network Communication" command is sent to the iBank Network Servers and a display message of "Ready to Send" appears at the PaySecure apparatus in step 423 and the PaySecure apparatus (i.e., cell phone/PDA for this embodiment) is ready to communicate. The PaySecure method then proceeds as indicated in FIG. 3B to FIG. 3C, as discussed above. If the acceptance and encrypting steps are determined to be unsuccessful in step 421, a display of "No Valid Input" message appears at the PaySecure apparatus and a return to step 415 to request "Input Finger Print" is repeated.

Figure 5A:
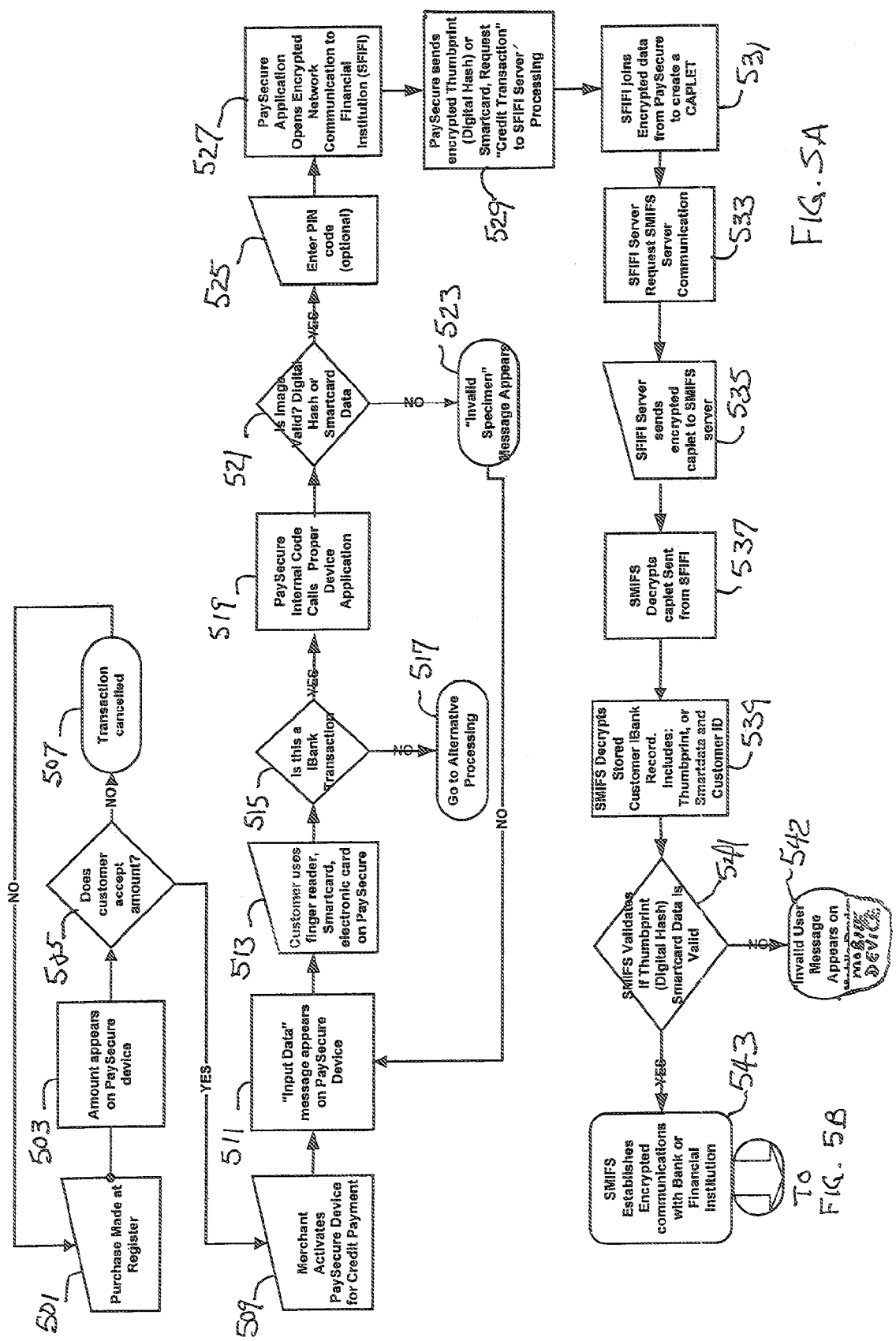
FIG. 5A and FIG. 5B illustrate an exemplary flow diagram for a PaySecure Credit Payment transaction in the present invention.
Figure 5B:
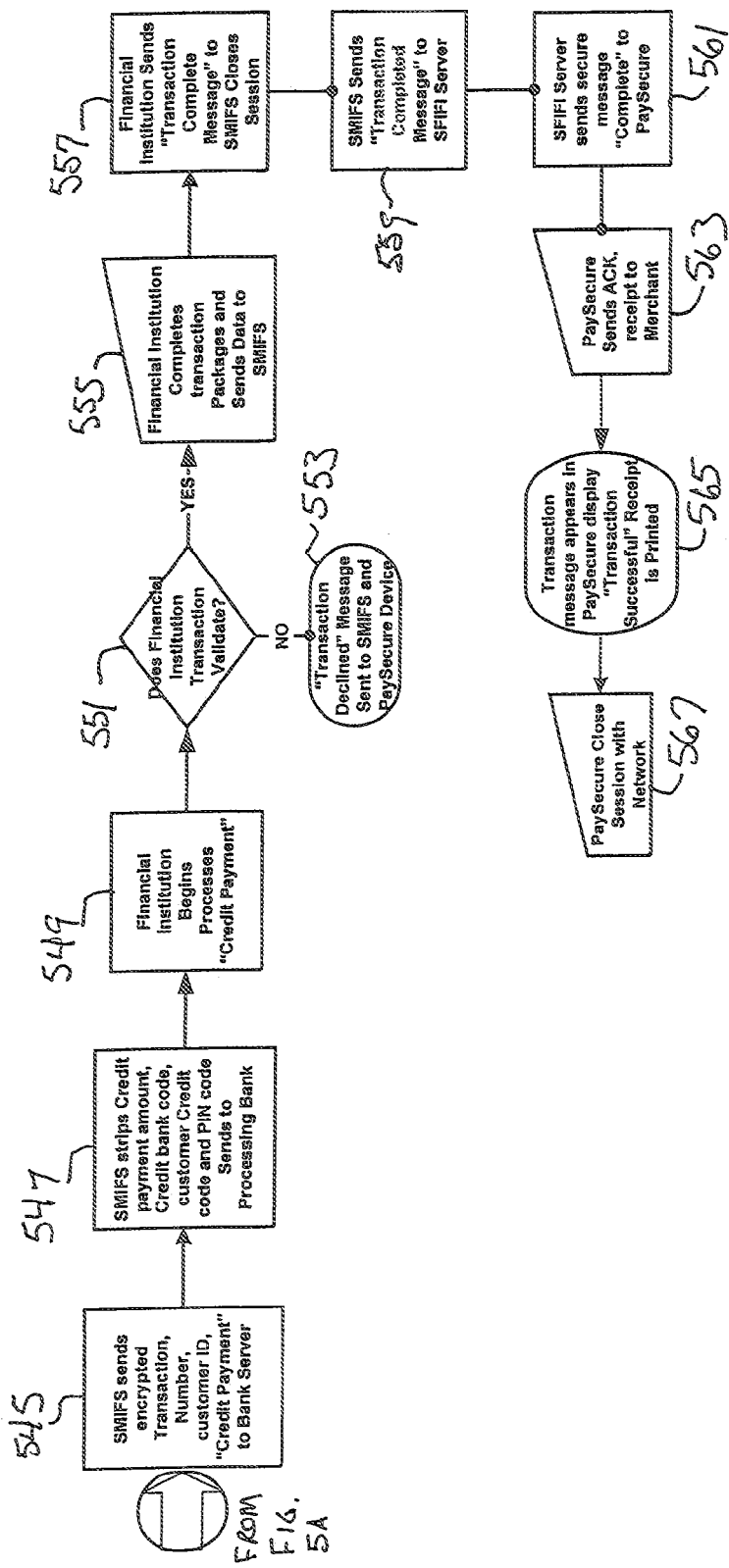

FIG. 5A and FIG. 5B illustrate an exemplary flow diagram for a PaySecure Credit Payment transaction in the present invention. Please note that the terms "device" and "apparatus" are used interchangeably in this document. In step 501, a purchase is made at a POS register. The amount of the purchase appears on the PaySecure apparatus in step 503. In step 505, it is determined whether or not the customer/user accepts the amount of the purchase. If NO, the transaction is cancelled in step 507 and the routine returns to step 501. If YES, the merchant activates the PaySecure apparatus for credit payment in step 509. In step 511, and "Input Data" message appear on the display/input window of the PaySecure apparatus. The customer uses the biometric data/fingerprint reader, Smartcard, electronic card to access the PaySecure in step 513. In step 515, it is determined whether or not this is an iBank transaction. If NO, alternative processing is accessed in step 517. In step 519, If YES, PaySecure internal code calls the proper device/application. Step 521 determines whether the mage, digital hash or Smartcard Data is valid. Optionally, a PIN code may be entered in step 525. In Step 527, the PaySecure application opens encrypted network communications to a financial institution through SFIFI.

Next, the PaySecure sends encrypted biometric data/fingerprint (digital hash) or Smartcard information with a "Request Credit Transaction" message to the SFIFI server for processing in step 529. In step 531, the SFIFI joins encrypted data from PaySecure to create a CAPLET. The SFIFI server sends encrypted CAPLET to SMIFS server in step 535. In step 537, the SMIFS server decrypts CAPLET received from SFIFI. The SMIFS further decrypts the stored customer "iBank Record" that includes, but is not limited to: biometric data/fingerprint data, Smartdata and customer_ID in step 539. In step 541, the SMIFS validate whether the biometric/fingerprint data (digital hash) or Smartcard data is valid. If NO, an "Invalid User" message appears on the PaySecure apparatus in step 542. If YES, a SMIFS establishes encrypted communications with a bank, other financial institution or secure facility in step 543.

As shown in FIG. 5B, the SMIFS sends encrypted transaction number, customer_ID, and "Credit Payment" message to the bank server in step 545. In step 547, the SMIFS strips credit payment amount, credit bank code, customer credit code and PIN code and sends to processing bank. The financial institution begins processing "Credit Payment" in step 549. In step 551, it is determined whether the financial institution validates the transaction. If NO, a "Transaction Declined" message is sent to the SMIFS and the PaySecure apparatus in step 553. If YES, the financial institution completes the transaction; and packages and sends data to the SMIFS. In step 557, the financial institution sends a "Transaction Complete" message to SMIFS and closes the session. The SMIFS sends a "Transaction Completed" message to the SFIFI server in step 559. The SFIFI server sends a secure message "Complete" to the PaySecure apparatus in step 561. The PaySecure sends and "ACK" receipt to the Merchant in step 563. In step 565, a "Transaction Successful" message appears on the display/input window of the PaySecure apparatus. The PaySecure apparatus closes the session with the network in step 567.

Figure 6A:
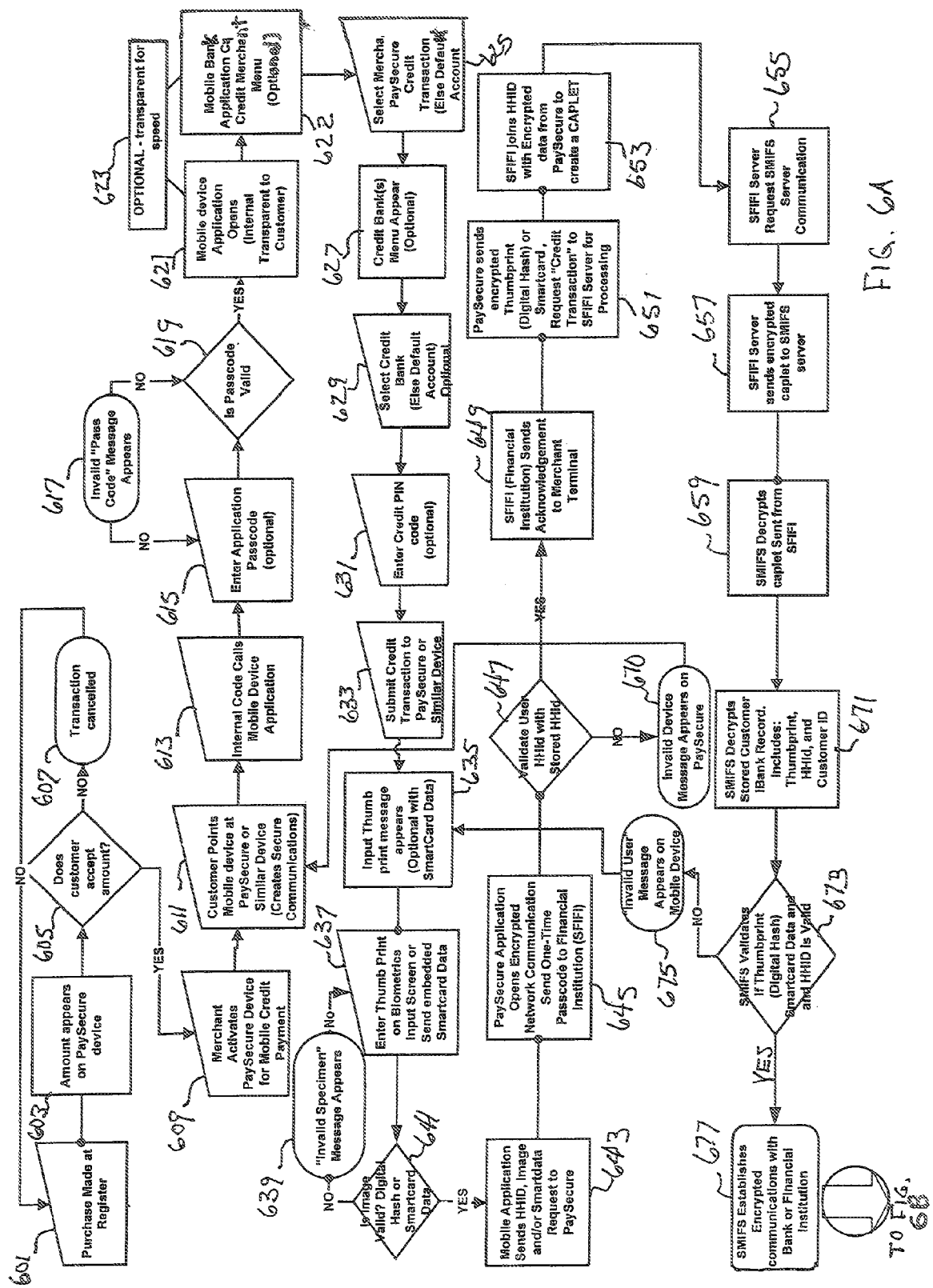
FIG. 6A and FIG. 6B illustrate an exemplary flow diagram of a PaySecure Credit payment in the present invention.
Figure 6B:
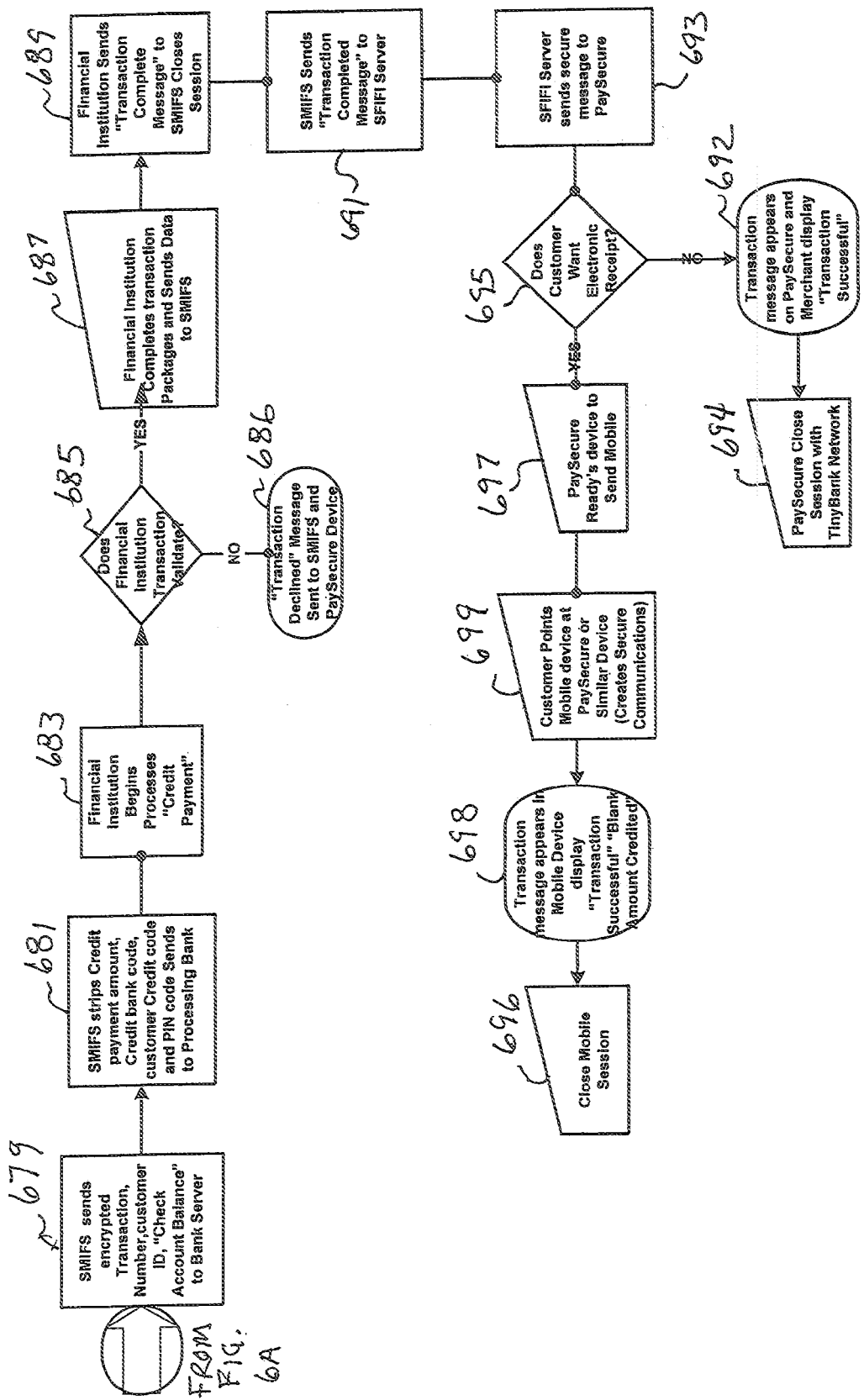

FIG. 6A and FIG. 6B illustrate an exemplary flow diagram of a PaySecure Credit payment in the present invention. In step 601, a purchase is made at a POS register. The amount of the purchase appears on the display/input window of the PaySecure apparatus in step 603. In step 605, it is determined whether or not the customer/user will accept the purchase amount. If NO, the transaction is cancelled and the routine returns to step 601. If YES, the merchant activates a PaySecure apparatus for a Portable/Mobile Credit Payment in step 609.

The customer points the PaySecure Portable/Mobile apparatus at a PaySecure or similar apparatus to create a secure communication in step 611. In step 613, an internal code calls the Portable/Mobile device application. Optionally, an application pass code is entered at step 615. In step 617, it is determined whether or not the pass code is valid. If NO, an "Invalid Pass Code" message appears on the PaySecure apparatus (i.e., the mobile device). If YES, the mobile device application opens (this process is transparent to the customer/user) in step 621. Optionally, step 623 uses the transparent process for speed. Optionally, the Mobile Bank application card Credit Merchant Menu appears on the apparatus in step 625. Optionally the "Credit Bank(s) Menu" appears in step 627. Optionally, in step 629, the user selects Credit Bank or the else the Default Account is selected. In step 631, a PIN code is optionally entered. In step 633, a credit transaction is submitted to PaySecure or similar device.

An "Input biometric/fingerprint data or Smartcard" message appears at the PaySecure apparatus in step 635. The biometric/fingerprint data is input on the display/input screen of the PaySecure apparatus in step 637. Step 641 determines whether or not the biometric/fingerprint data is valid. If NO, an "Invalid Specimen" message appears at the PaySecure apparatus and the routine returns to step 637. If YES, the Mobile Application sends and HHID, image and or Smartdata request to PaySecure in step 643. In step 645, the PaySecure application opens encrypted network communications and sends a one-time pass code to a financial institution SFIFI.

In step 647, it is determined whether or not the user HHid is valid by being in accordance with the stored HHid. If NO, and "Invalid Device" message appears on the PaySecure apparatus in step 670. If YES, the SFIFI sends an acknowledgement to the merchant terminal. PaySecure sends encrypted biometric/fingerprint data (digital hash) or Smartcard request for "Credit Transaction" to the SFIFI server for processing in step 651. In step 653, SFIFI joins HHiD with encrypted data from PaySecure in order to create a CAPLET. SFIFI server requests SMIFS server communication in step 655. In step 657, the SFIFI server sends encrypted CAPLET to SMIFS server. The SMIFS decrypts the CAPLET sent from SFIFI in step 659. In step 671, the SMIFS decrypts Stored Customer "iBank Record" that includes, but is not limited to: biometric/fingerprint data, HHiD, and customer_ID. In step 673, the SMIFS determines whether or not the biometric/fingerprint data (digital hash), Smartcard data and HHiD are valid. If NO, the "Invalid User" message appears on the PaySecure apparatus (i.e., Portable/Mobile device). If YES, the SMIFS establishes encrypted communications with a bank, financial institution or other secure facility.

As shown in FIG. 6B, in step 679, the SMIFS sends encrypted transaction number, customer_ID, and "Check Account Balance" command to bank server. The SMIFS strips credit payment amount, credit bank code, customer credit code and PIN code and sends to processing bank in step 681. The financial institution begins processing of "Credit Payment" in step 683. In step 685, the financial institution determines whether or not the transaction is valid. If NO, a "Transaction Declined" message is sent to SMIFS and the PaySecure apparatus. IF YES, the financial institution completes the transaction package and sends data to the SMIFS in step 687.

In step 689, the financial institution sends "Transaction Complete" message to SMIFS and closes the session. The SMIFS sends "Transaction Complete" message to SFIFI server in step 691. The SFIFI server sends a secure message to PaySecure in step 693. In step 695, it is determined whether or not the customer wants an electronic receipt. The PaySecure prepares to send information to the PaySecure apparatus (i.e., Portable/Mobile device) in step 697. In step 699, the customer points the PaySecure apparatus or similar at the PaySecure (i.e. to create a secure communication). A "Transaction Successful" message with an "XXX Amount Credited" message appears on the display of the PaySecure apparatus in step 698. In step 696, the PaySecure apparatus mobile session is closed.

Figure 7A:
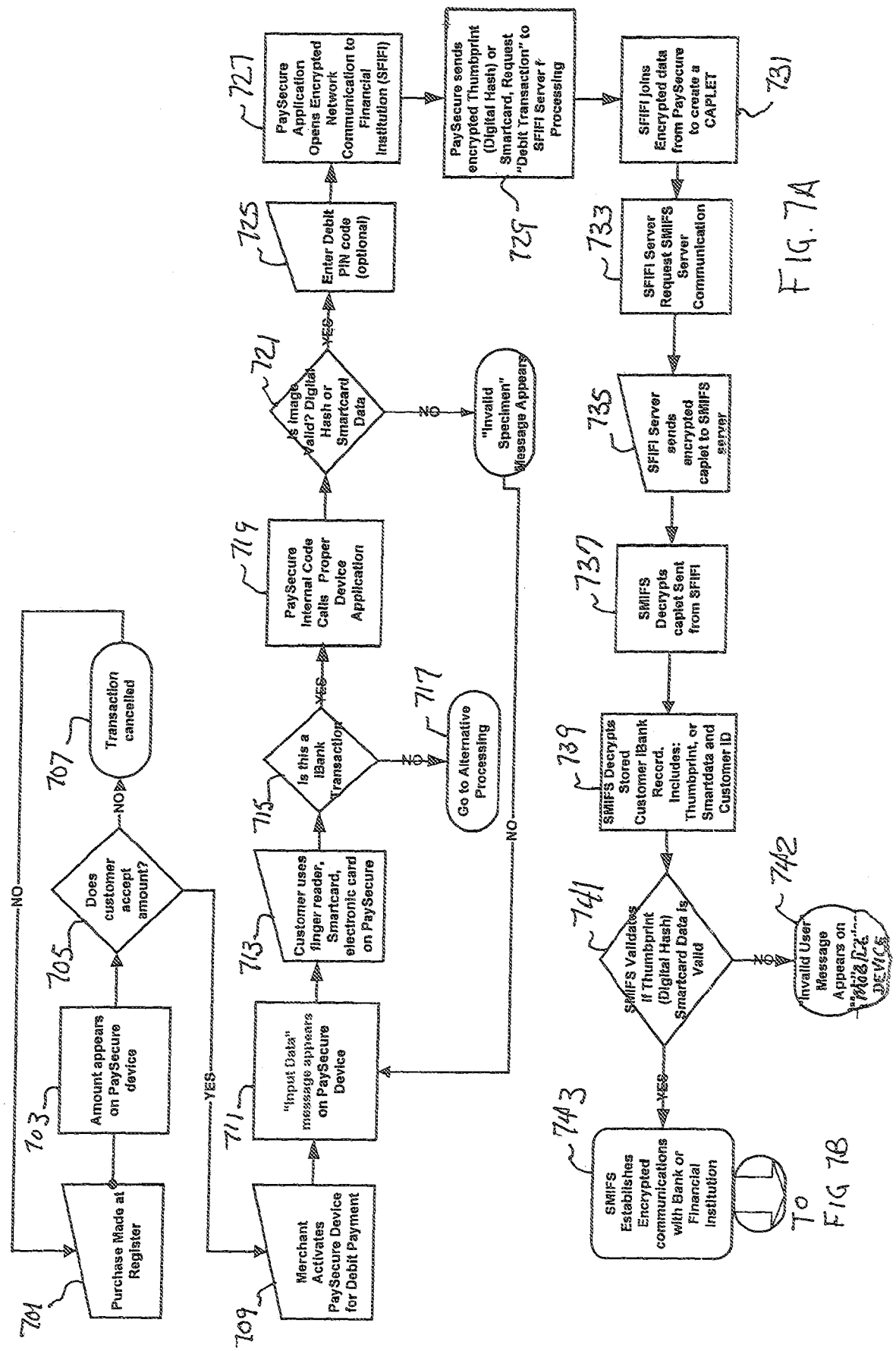
FIG. 7A and FIG. 7B illustrate an exemplary flow diagram for a PaySecure Debit Payment transaction in the present invention.
Figure 7B:
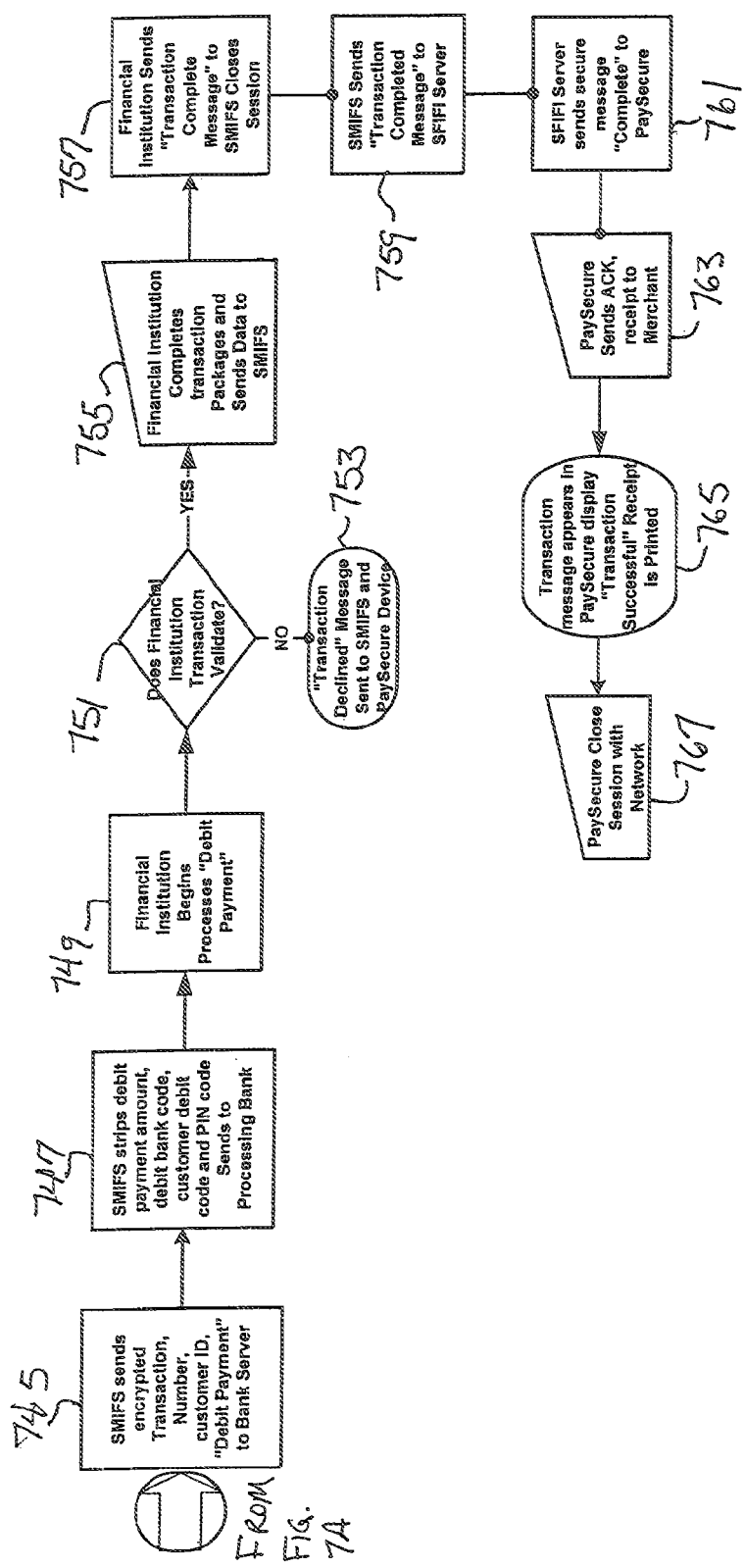

FIG. 7A and FIG. 7B illustrate an exemplary flow diagram for a PaySecure Debit Payment transaction in the present invention. Please note that the terms "device" and "apparatus" are used interchangeably in this document. In step 701, a purchase is made at a POS register. The amount of the purchase appears on the PaySecure apparatus in step 703. In step 705, it is determined whether or not the customer/user accepts the amount of the purchase. If NO, the transaction is cancelled in step 707 and the routine returns to step 701. If YES, the merchant activates the PaySecure apparatus for debit payment in step 709. In step 711, and "Input Data" message appear on the display/input window of the PaySecure apparatus. The customer uses the biometric data/fingerprint reader, Smartcard, electronic card to access the PaySecure in step 713. In step 715, it is determined whether or not this is an iBank transaction. If NO, alternative processing is accessed in step 717. In step 719, If YES, PaySecure internal code calls the proper device/application. Step 721 determines whether the mage, digital hash or Smartcard Data is valid. Optionally, a PIN code may be entered in step 725. In Step 727, the PaySecure application opens encrypted network communications to a financial institution through SFIFI.

Next, the PaySecure sends encrypted biometric data/fingerprint (digital hash) or Smartcard information with a "Request Debit Transaction" message to the SFIFI server for processing in step 729. In step 731, the SFIFI joins encrypted data from PaySecure to create a CAPLET. The SFIFI server sends encrypted CAPLET to SMIFS server in step 735. In step 737, the SMIFS server decrypts CAPLET received from SFIFI. The SMIFS further decrypts the stored customer "iBank Record" that includes, but is not limited to: biometric data/fingerprint data, Smartdata and customer_ID in step 739. In step 741, the SMIFS validate whether the biometric/fingerprint data (digital hash) or Smartcard data is valid. If NO, an "Invalid User" message appears on the PaySecure apparatus in step 742. If YES, a SMIFS establishes encrypted communications with a bank, other financial institution or secure facility in step 743.

As shown in FIG. 7B, the SMIFS sends encrypted transaction number, customer_ID, and "Debit Payment" message to the bank server in step 745. In step 747, the SMIFS strips debit payment amount, debit bank code, customer debit code and PIN code and sends to processing bank. The financial institution begins processing "Debit Payment" in step 749. In step 751, it is determined whether the financial institution validates the transaction. If NO, a "Transaction Declined" message is sent to the SMIFS and the PaySecure apparatus in step 753. If YES, the financial institution completes the transaction; and packages and sends data to the SMIFS. In step 755, the financial institution sends a "Transaction Complete" message to SMIFS and closes the session. The SMIFS sends a "Transaction Completed" message to the SFIFI server in step 759. The SFIFI server sends a secure message "Complete" to the PaySecure apparatus in step 761. The PaySecure sends and "ACK" receipt to the Merchant in step 763. In step 765, a "Transaction Successful" message appears on the display/input window of the PaySecure apparatus. The PaySecure apparatus closes the session with the network in step 767.

Figure 8A:
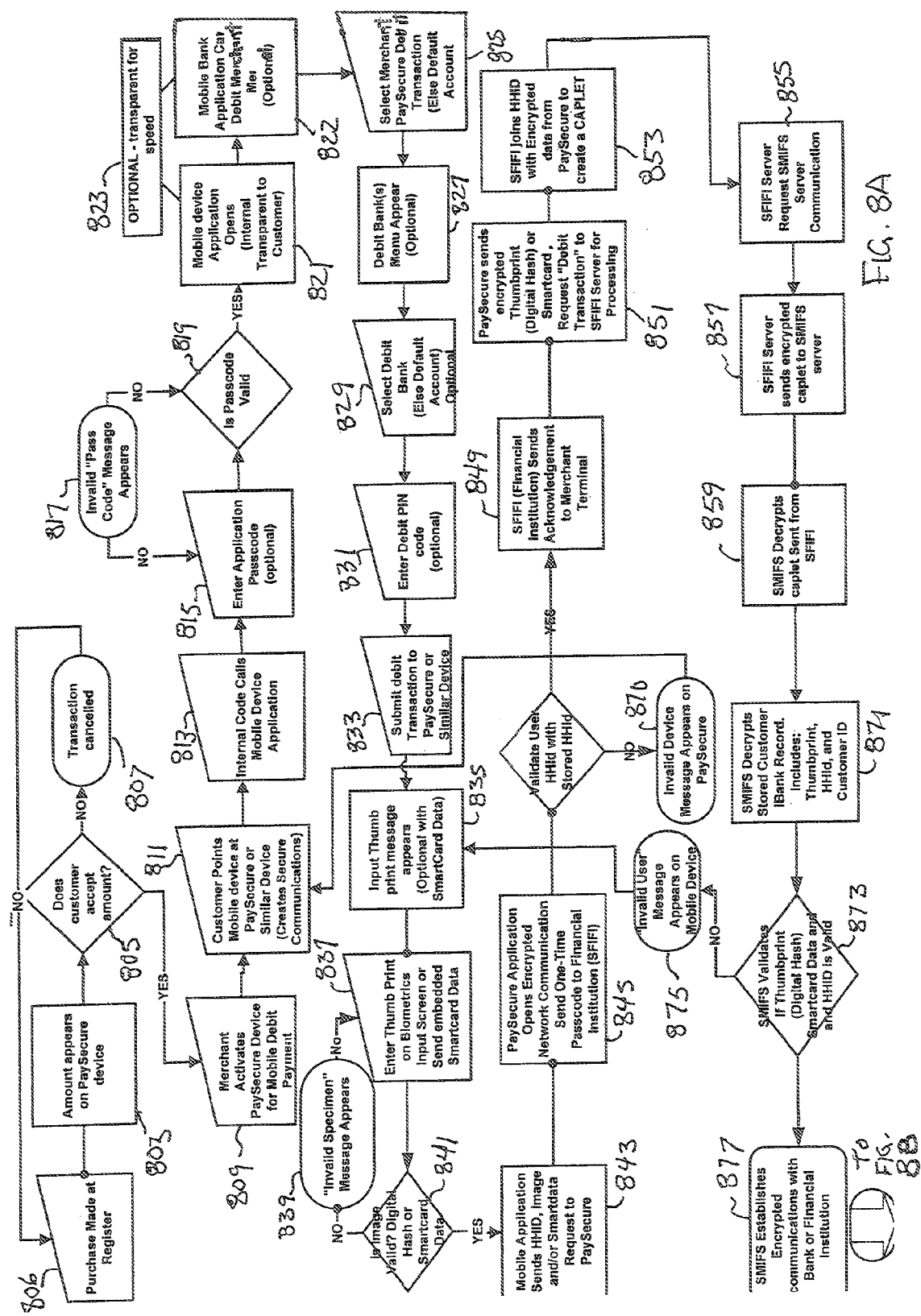
FIG. 8A and FIG. 8B illustrate an exemplary flow diagram of a PaySecure Debit payment in the present invention.
Figure 8B:
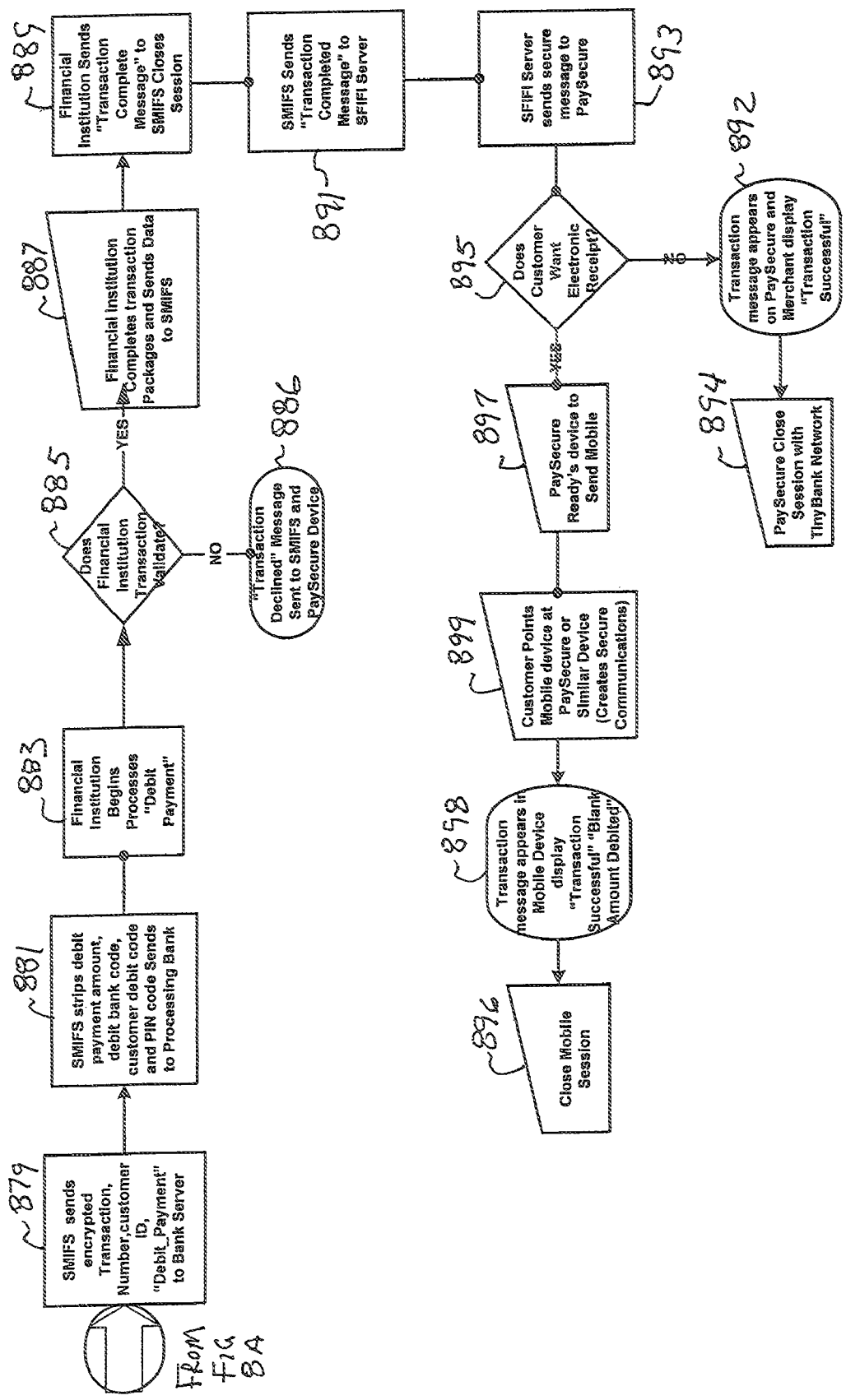

FIG. 8A and FIG. 8B illustrate an exemplary flow diagram of a PaySecure Debit payment in the present invention. In step 801, a purchase is made at a POS register. The amount of the purchase appears on the display/input window of the PaySecure apparatus in step 803. In step 805, it is determined whether or not the customer/user will accept the purchase amount. If NO, the transaction is cancelled and the routine returns to step 801. If YES, the merchant activates a PaySecure apparatus for a Portable/Mobile Debit Payment in step 809.

The customer points the PaySecure Portable/Mobile apparatus at a PaySecure or similar apparatus to create a secure communication in step 811. In step 813, an internal code calls the Portable/Mobile device application. Optionally, an application pass code is entered at step 815. In step 817, it is determined whether or not the pass code is valid. If NO, an "Invalid Pass Code" message appears on the PaySecure apparatus (i.e., the mobile device). If YES, the mobile device application opens (this process is transparent to the customer/user) in step 821. Optionally, step 823 uses the transparent process for speed. Optionally, the Mobile Bank application card Debit Merchant Menu appears on the apparatus in step 825. Optionally the "Debit Bank(s) Menu" appears in step 827. Optionally, in step 829, the user selects Debit Bank or the else the Default Account is selected. In step 831, a PIN code is optionally entered. In step 833, a debit transaction is submitted to PaySecure or similar device.

An "Input biometric/fingerprint data or Smartcard" message appears at the PaySecure apparatus in step 835. The biometric/fingerprint data is input on the display/input screen of the PaySecure apparatus in step 837. Step 841 determines whether or not the biometric/fingerprint data is valid. If NO, an "Invalid Specimen" message appears at the PaySecure apparatus and the routine returns to step 837. If YES, the Mobile Application sends and HHID, image and or Smartdata request to PaySecure in step 843. In step 845, the PaySecure application opens encrypted network communications and sends a one-time pass code to a financial institution SFIFI.

In step 847, it is determined whether or not the user HHid is valid by being in accordance with the stored HHid. If NO, and "Invalid Device" message appears on the PaySecure apparatus in step 870. If YES, the SFIFI sends an acknowledgement to the merchant terminal. PaySecure sends encrypted biometric/fingerprint data (digital hash) or Smartcard request for "Debit Transaction" to the SFIFI server for processing in step 851. In step 853, SFIFI joins HHiD with encrypted data from PaySecure in order to create a CAPLET. SFIFI server requests SMIFS server communication in step 855. In step 857, the SFIFI server sends encrypted CAPLET to SMIFS server. The SMIFS decrypts the CAPLET sent from SFIFI in step 859. In step 871, the SMIFS decrypts Stored Customer "iBank Record" that includes, but is not limited to: biometric/fingerprint data, HHiD, and customer_ID. In step 873, the SMIFS determines whether or not the biometric/fingerprint data (digital hash), Smartcard data and HHiD are valid. If NO, the "Invalid User" message appears on the PaySecure apparatus (i.e., Portable/Mobile device). If YES, the SMIFS establishes encrypted communications with a bank, financial institution or other secure facility.

As shown in FIG. 8B, in step 879, the SMIFS sends encrypted transaction number, customer_ID, and "Check Account Balance" command to bank server. The SMIFS strips debit payment amount, debit bank code, customer debit code and PIN code and sends to processing bank in step 881. The financial institution begins processing of "Debit Payment" in step 883. In step 885, the financial institution determines whether or not the transaction is valid. If NO, a "Transaction Declined" message is sent to SMIFS and the PaySecure apparatus in step 886. IF YES, the financial institution completes the transaction package and sends data to the SMIFS in step 887.

In step 889, the financial institution sends "Transaction Complete" message to SMIFS and closes the session. The SMIFS sends "Transaction Complete" message to SFIFI server in step 891. The SFIFI server sends a secure message to PaySecure in step 893. In step 895, it is determined whether or not the customer wants an electronic receipt. The PaySecure prepares to send information to the PaySecure apparatus (i.e., Portable/Mobile device) in step 897. In step 899, the customer points the PaySecure apparatus or similar at the PaySecure (i.e. to create a secure communication). A "Transaction Successful" message with an "XXX Amount Debited" message appears on the display of the PaySecure apparatus in step 898. In step 896, the PaySecure apparatus mobile session is closed.

Figure 9A:
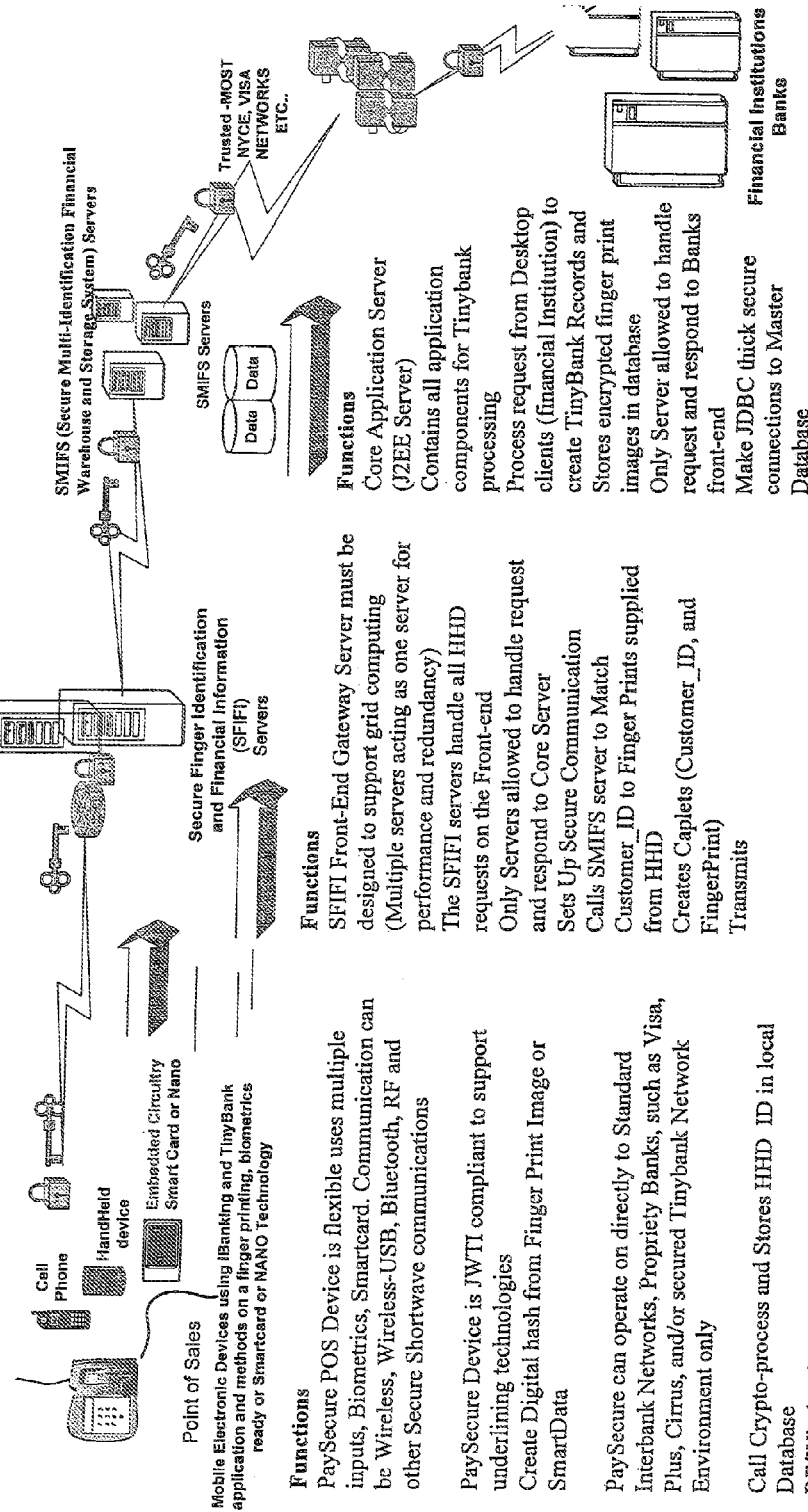

FIG. 9A and FIG. 9B are exemplary charts that outlines the functions of the TinyBank Network System Architecture. As shown in FIG. 9A, the PaySecure apparatus POS is versatile and provides multiple inputs. In particular, communications can be by any of wireless-USB, Bluetooth, RF and other Secure Shortwave communications. In addition, the PaySecure apparatus is JWTI compliant to support underlining technologies and can create Digital hash from Thumb/Finger Print Image or SmartData. PaySecure can operate directly onto Standard Interbank Networks, Propriety Banks, such as Visa, Plus, Cirrus, and/or secured Tinybank Network Environments. Further, the PaySecure apparatus can call Cryptoprocess and Stores HHD_ID in a local Database.

As shown in FIG. 9A, the SFIFI Front-End Gateway Server is designed to support grid computing (i.e., Multiple servers acting as one server for performance and redundancy). In addition, the SFIFI servers handle all HHD requests on the Front-end. Further, only SFIFI Servers are allowed to handle request and respond to a Core Server; and set-up secure communication. Furthermore, the SFIFI calls the SMIFS server to Match Customer_ID to Finger Prints supplied from HHD and creates and transmits CAPLETS (Customer_ID, and FingerPrint).

As shown in FIG. 9A, the SMIFS are core application servers (J2EE Server) and contain all application components for Tinybank processing. Further, the SMIFS process request from Desktop clients (e.g., financial Institution) to create TinyBank Records and Stores encrypted finger print images in database. Further, the SMIFS is the only Servers allowed to handle request and respond to Banks front-end. Moreover, the SMIFS Servers make JDBC thick secure connections to the Master Database.

As shown in FIG. 9B, the TinyBank Network can exist, but is not limited to: Cellular Networks such as Verizon, AT&T, Sprint, T-Mobile Cingular or Financial Backbones, such as Visa, NYCE, Cirrus. In addition, the security for the iBanking Network includes, but is not limited to: a Secure Communications Environment, a Crypto Environment; and Databases for HHD_IDs. Specifically, the Secure Communications Environment includes, but is not limited to: a Java Crypto Environment (JCE); Security and Trust Services API for J2ME™; SHA2 or other Secure hashing Algorithms; or Enhanced Security Environment from HHD. Further, the Crypto Environment includes, but is not limited to: profiling to encrypt Finger Prints, Financial Data and Customer_ID; providing all transmissions are encrypted using 256-2048 byte; creates encryption keys for all images stored using the highest level of encryption supported in Java for transmissions; provides Private Network Secure Session (peer-to-peer) is established with HHD and TBN; and utilizes HHD_ID, Customer_ID and Image_ID (TripleID) to complete transactions. Furthermore, the SFIFI servers Database for HHD_IDs provides a simple storage Environment with a storing database (i.e., Oracle), obfuscation processes; and stores Encrypted HHD_ID's.

The foregoing description of the invention illustrates and describes the present invention. Additionally, the disclosure shows and describes only the preferred embodiments of the invention in the context of a method for increasing the yield of programmable logic devices, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described herein above are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

What is claimed:

1. An apparatus, comprising:
   a biometric data reader configured to receive biometric information from at least one of a user or a device configured to retrieve biometric information and to create a hash image of the biometric information;
   an input device configured to receive user data including a pass code; and
   at least one communications port to enable communication with a financial institution, wherein the at least one communications port is configured to establish communications with the financial institution, upon successful encryption of the hash image, and to send the pass code to the financial institution,
   wherein upon receipt of a command from the financial institution that the pass code is valid, the apparatus is further configured to send the hash image to the financial institution to attempt to validate user information with corresponding information stored at the financial institution, and
   wherein connection is established with the financial institution network if the validation is successful.

2. The apparatus of claim 1, wherein the apparatus is configured to transmit an open device command upon receipt of an input code from the input device and to provide the user with an option to enter biometric information in the biometric data reader.

3. The apparatus of claim 1, wherein the apparatus is configured to be activated at a point of sale terminal and the user information is used to approve or deny a financial transaction.

4. The apparatus of claim 1, wherein the input device is an alphanumeric keypad.

5. The apparatus of claim 1, wherein the apparatus is a portable wireless device.

6. The apparatus of claim 1, wherein the input device is a display window configured to display user options and results, wherein the display window is configured to support touch screen inputs.

7. The apparatus of claim 1, further comprising a card reader input port configured to read electronic data from a card or other media and to use the biometric image in processing data.

8. An apparatus, comprising:
   a receiver to receive a hash image of biometric information and a pass code associated with a user from a mobile apparatus; and
   a processor to enable communication with a financial institution upon validation of successful encryption of the hash image, to transmit the pass code and the hash image to the financial institution to attempt to validate user information with corresponding information stored at the financial institution, and to establish a connection with the financial institution upon receipt of a validation command from the financial institution,
   wherein the financial institution uses the encrypted hash image to determine access information associated with the user and to create a record including the encrypted hash image and account information associated with the user.

9. The apparatus of claim 8, further comprising means for transmitting the record to a server for further validation.

10. The apparatus of claim 9, wherein a record stamp is created if the record is validated and stored account information associated with the user is retrieved.

11. An method, comprising:
    receiving-biometric information from a user on a processing device configured to retrieve biometric information and creating a hash image of the biometric information;
    establishing, on a communications port associated with a processor, communications with the financial institution, upon successful encryption of the hash image;
    receiving, by the processor, a pass code and sending the pass code to the financial institution;
    receiving, by the processor, a command from the financial institution that the pass code is valid;
    sending, by the processor, the hash image to the financial institution to attempt to validate user information with corresponding information stored at the financial institution; and
    establishing, by the processor, a connection with a financial institution network if the validation is successful.

12. The method of claim 11, further comprising transmitting an open device command upon receipt of a valid code and providing the user with an option to enter biometric information in the biometric data reader.

13. A method, comprising:
    receiving, by a receiving module, a hash image of biometric information and a pass code associated with a user from a mobile apparatus; and
    communicating, by a processor, with a financial institution upon validation of successful encryption of the hash image, wherein the communicating comprises transmitting the pass code and the hash image to the financial institution to attempt to validate user information with corresponding information stored at the financial institution and establishing a connection with the financial institution upon receipt of a validation command from the financial institution,
    wherein the financial institution uses the encrypted hash image to determine access information associated with the user and to create a record including the encrypted hash image and account information associated with the user.

14. The method of claim 13, further comprising transmitting the record to a server for further validation.

15. The method of claim 14, further comprising creating a record stamp if the record is validated and retrieving stored account information associated with the user.

* * * * *

UNITED STATES PATENT AND TRADEMARK OFFICE
CERTIFICATE OF CORRECTION

| | | |
|---|---|---|
| PATENT NO. | : 7,809,169 B2 | |
| APPLICATION NO. | : 11/365863 | |
| DATED | : October 5, 2010 | |
| INVENTOR(S) | : Pamela J. Martinez | |

It is certified that error appears in the above-identified patent and that said Letters Patent is hereby corrected as shown below:

Title page and Col. 1, line 4

Please correct the title of the invention to read as follows:

SECURE POINT OF SALES BIOMETRIC IDENTIFICATION PROCESS AND FINANCIAL SYSTEM FOR STANDALONE AND REMOTE DEVICE TRANSACTIONS (PAYSECURE)

Signed and Sealed this
Fifteenth Day of February, 2011

David J. Kappos
*Director of the United States Patent and Trademark Office*